(12) United States Patent
Bushnell (10) Patent No.: US 6,289,084 B1
(45) Date of Patent: *Sep. 11, 2001

(54) APPARATUS, METHOD AND SYSTEM FOR PERSONAL TELECOMMUNICATION CALL SCREENING AND ALERTING

(75) Inventor: William J. Bushnell, St. Charles, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/087,442

(22) Filed: May 29, 1998

(51) Int. Cl.[7] .................... H04M 1/64; H04M 11/00; H04M 3/00; H04M 3/42
(52) U.S. Cl. .................. 379/67.1; 379/88.11; 379/93.23; 379/192; 379/201; 379/207
(58) Field of Search ................ 379/67.1, 74, 77, 379/88.22–88.27, 88.13, 88.16, 199, 210–212, 142, 188, 34, 372–376, 354–356, 192, 201, 207, 93.23, 100.14, 88.11, 88.12; 709/217–219; 455/3.1, 4.1, 4.2, 461

(56) References Cited

U.S. PATENT DOCUMENTS

| | | | | |
|---|---|---|---|---|
| 4,266,098 | * | 5/1981 | Novak .................................... | 379/77 |
| 5,357,564 | * | 10/1994 | Gupta et al. .......................... | 379/188 |
| 5,467,388 | * | 11/1995 | Redd, Jr. et al. ..................... | 379/196 |
| 5,488,652 | * | 1/1996 | Bielby et al. .......................... | 379/88 |
| 5,644,629 | * | 7/1997 | Chow ..................................... | 379/142 |
| 5,732,128 | * | 3/1998 | Bushnell ............................... | 379/119 |
| 5,748,718 | * | 5/1998 | Manicone .............................. | 379/131 |
| 5,946,386 | * | 8/1999 | Rogers et al. ........................ | 379/265 |
| 5,978,451 | * | 11/1999 | Swan et al. ........................... | 379/88.24 |
| 6,029,195 | * | 2/2000 | Herz ....................................... | 709/219 |

\* cited by examiner

Primary Examiner—Allan Hoosain
(74) Attorney, Agent, or Firm—Nancy R. Gamburd (57) ABSTRACT

An apparatus, method and system are illustrated which provide for personal telecommunication incoming call screening and alerting. In the various embodiments, the incoming call screening and alerting utilizes a personalized affinity database, based upon individual calling behaviors and patterns. In the preferred embodiment, the affinity database includes telephone numbers and names for outgoing calls (dialed numbers), and for those incoming calls that have a predetermined minimum duration following answering (minimum off hook time period). As a consequence, erroneous or unwanted incoming calls are not included within the affinity database. The preferred system includes a line unit couplable to customer premise equipment (such as a telephone), a network signaling interface, a network trunk interface, a memory, and a processor. The processor includes instructions for determining whether received network signaling information includes caller identification information, which matches an affinity number, such as a number from which a consumer would like to receive a telephone call. For automatic call screening and alerting, the processor has further instructions for assigning a first priority to a corresponding network communication when the caller identification information matches an affinity number, such as providing a distinctive ring or allowing the communication during certain periods of time, and for assigning a second priority to the corresponding network communication when the caller identification information does not match an affinity number, such as routing the incoming call to an automatic messaging or voice mail system.

45 Claims, 7 Drawing Sheets

APPARATUS, METHOD AND SYSTEM FOR PERSONAL TELECOMMUNICATION CALL SCREENING AND ALERTING

CROSS-REFERENCE TO RELATED APPLICATION

This application is related to Bushnell, "Apparatus, Method and System for Personal Telecommunication Speed Calling", U.S. patent application Ser. No. 09/087,412, Lucent Technologies, filed concurrently herewith and commonly assigned to Lucent Technologies, Inc., and incorporated by reference herein.

FIELD OF THE INVENTION

The present invention relates in general to telecommunication services and, more particularly, to an apparatus, method and system for personal telecommunication incoming call screening and alerting.

BACKGROUND OF THE INVENTION

With the advent of sophisticated telecommunication services, telecommunication consumers frequently experience the reception of unwanted or otherwise undesirable telephone calls. For example, telemarketers frequently use computerized calling procedures, which often interrupt consumers at unwanted times, such as at meal times.

In the prior art, telephone customers are able to screen such incoming calls, using a caller identification ("caller ID") system, after they have been alerted to the incoming call, typically by an incoming ring. Under such circumstances, the consumer is interrupted from their current activity, and must personally examine the incoming caller identification information to determine whether they want to answer the incoming call.

Another current method of call screening includes use of a telephone answering and message recording machine. Under this method, the consumer typically allows the machine to answer, and personally listens to any message, which may be in the process of being recorded. The consumer may then choose to interrupt the message recording process and answer the call at that time. Again, the consumer has been interrupted from his or her current activity, and must also personally listen to the incoming message to screen the call. In addition, this type of call screening is unavailable to consumers utilizing centralized voice mail systems, which typically do not broadcast the audible message as it is being recorded.

As a consequence, a need remains for an apparatus, method and system that may be used by a telecommunication consumer to automatically screen their incoming calls. Such call screening should occur without personal interruption and without any required user intervention (such as caller ID examination or listening to a message). In addition, such an apparatus, method and system should be user friendly, should be personalized and automatically tailored to the needs, tastes and preferences of individual customers. In addition, the apparatus, method and system should be cost effective and capable of implementation in existing telecommunication systems.

SUMMARY OF THE INVENTION

The present invention provides an apparatus, method and system to screen incoming calls, without consumer interruption and without personal involvement in the screening process. The present invention provides such automatic screening in accordance with the personal and tailored needs, tastes and preferences of the individual telecommunication consumer. In addition, the apparatus embodiment may be implemented in customer premise equipment, such as telephones, while the system embodiment may be implemented in existing telecommunication systems, such as network switches. The various embodiments may also be expanded to include more than voice communications, such as faxing, other data communications, and video conferencing.

The personal call screening and alerting of the present invention incorporates an "organic persona" concept, such that not only are the services personalized or customized to the needs or preferences of individual consumers, but also the apparatus or system automatically learns these preferences by observing the actions or activities of the individual consumer.

In accordance with the present invention, such personal and individualized automatic call screening and alerting is based upon a statistical or other probabilistic likelihood that the individual consumer does or does not, in fact, want to receive an incoming call from a particular source at a particular time. Such a likelihood is derived from a measure of an affinity between the calling and called parties, such that the called party is more likely to want to receive a call from someone with whom they have a greater or more significant affinity or association, such as their parent or child, and less likely to want to receive a call from someone with whom they have a lesser or no affinity or association, such as a telemarketer or a prankster. As a consequence, calls having a greater affinity measurement are given a correspondingly higher priority in the screening process, and calls having a lesser affinity are given a correspondingly lower priority in the screening process.

Such affinity measures may be performed or derived in a variety of ways. In the preferred embodiment, the present invention measures such an affinity based upon two parameters. First, affinity is based upon the frequency of calls between the called and calling parties. For example, a higher affinity may exist between people who call each other frequently. Second, affinity is based on the duration or holding time of such calls, with calls having a brief duration indicative of a lower affinity, such as calls from telemarketers, wrong numbers, or prank calls. The telephone numbers corresponding to the calls having such a comparatively high affinity, in the preferred embodiment, are stored in an affinity database, and are referred to herein as "affinity numbers".

A method for personal telecommunication call screening and alerting, in accordance with the present invention, includes, first, receiving an incoming telecommunication call. Second, the method determines whether caller identification information from the incoming telecommunication call is associated with or otherwise matches an affinity number, i.e., the incoming caller ID information is from someone whose telephone number is in the affinity database. Third, when the incoming caller identification information is associated with an affinity number, the method assigns a first priority to the incoming telecommunication call. Fourth, when the incoming caller identification information does not match or is not associated with an affinity number, i.e., the incoming caller ID information is from someone whose telephone number is not in the affinity database, the method assigns a second priority to the incoming telecommunication call.

For an incoming telecommunication call having the first priority, the method may provide a user alert, such as a ring or a distinctive ring. In contrast, for an incoming telecommunication call having the second priority, the method may not provide a user alert during a predetermined period of time, such as during meal times or late evening. Instead, the method typically provides telecommunication messaging and answering, such as voice mail, to the incoming call having the second priority. Other gradations or levels of priority may also be utilized, with corresponding levels of treatment for the incoming call. For example, incoming calls having the lowest level of priority, such as a third or fourth level of priority (e.g., calls from telemarketers or pranksters), may not be answered altogether or may be routed to a message system indicating that the user does not wish to receive those types of calls. Also for these variable or various levels of priority, different alerting patterns can be provided, such as a greater number of rings for higher priority calls.

In the various embodiments, an affinity database is maintained which has a plurality of telephone numbers referred to as affinity numbers. The telephone numbers in the affinity database ("affinity numbers") are determined by including telephone numbers corresponding to the user's outgoing telecommunication calls, and by including telephone numbers corresponding to the user's received incoming calls having a predetermined minimum duration. The affinity database is maintained preferably as an affinity stack, with any affinity numbers having a comparatively higher frequency of use clustered in an upper portion of the affinity stack, and with any affinity numbers having a comparatively higher duration of use clustered in an upper portion of the affinity stack.

Numerous other advantages and features of the present invention will become readily apparent from the following detailed description of the invention and the embodiments thereof, from the claims and from the accompanying drawings.

DETAILED DESCRIPTION OF THE PRESENT INVENTION

As mentioned above, a need remains for an apparatus, method and system to screen incoming calls, without consumer interruption and without personal involvement in the screening process. The present invention provides such automatic screening of incoming calls without such interruption or personal involvement, and provides such screening in accordance with the personal and tailored needs, tastes and preferences of the individual telecommunication consumer. In addition, the apparatus, method and system are user friendly, cost effective, and capable of implementation in existing telecommunication systems.

The personal call screening and alerting of the present invention incorporates an "organic persona" concept. "Persona" refers to services that are personalized or customized to the needs or preferences of individual consumers. "Organic" refers to services in which a telecommunication network or system automatically learns these preferences by observing the actions or activities of the individual consumer.

As mentioned above, in accordance with the present invention, such personal and individualized automatic call screening and alerting is based upon a statistical or other probabilistic likelihood that the individual consumer does or does not, in fact, want to receive an incoming call from a particular source at a particular time. Such a probabilistic likelihood is derived from a measure of an affinity between the calling and called parties, such that the called party is more likely to want to receive a call from someone with whom they have a greater or more significant affinity or association, such as their parent or child, and less likely to want to receive a call from someone with whom they have a lesser or no affinity or association, such as a telemarketer. As a consequence, in accordance with the present invention, calls having a greater affinity measurement are given a correspondingly higher priority in the screening process, and calls having a lesser affinity are given a correspondingly lower priority in the screening process.

Such affinity measures may be performed or derived in a variety of ways. As an automatic call screening process, in the preferred embodiment, the present invention measures such an affinity based upon two measurable parameters. First, affinity is based upon the frequency of calls between the called and calling parties. For example, a higher affinity may exist between people who call each other frequently. Second, affinity is based on the duration or holding time of such calls, with calls having a brief duration indicative of a lower affinity, such as calls from telemarketers, wrong numbers, or prank calls.

As discussed in greater detail below with respect to FIGS. 1–4, the present invention utilizes these calling patterns, frequency and duration, to create an affinity database having telephone numbers of those persons with whom the user has an affinity or varying levels of affinity. In the preferred embodiment, the affinity database is implemented as an affinity stack (or list) which contains these preferred telephone numbers of the individual consumer. Other methods of managing an affinity database may also be utilized. Incoming calls which are not from a source in the affinity database may be blocked or screened by a consumer, depending upon their individual preferences. Incoming calls that are from a source in the affinity database are given corresponding treatment based upon the consumer's preferences for a particular time of day. For example, calls with a very high affinity may always be allowed to alert the consumer; calls with a medium affinity may be allowed to alert the consumer except at meal times, late evening, etc.; and calls with a low or non-affinity may always be referred to an answering or voice mail system.

In addition, in the preferred embodiment, the consumer also may select or program his or her preferences and system activation/deactivation times, typically through a user interface. The consumer or other user may also designate a range of incoming telephone numbers to have a particular priority, such as for business calls from a particular exchange. For example, a user may want to designate a range of incoming numbers which may come from a particular client, customer or business associate, such as 847-248-xxxx incoming calls from Lucent Technologies, Inc. (designating a range of numbers from 847-248-0000 to 847-248-9999).

Figure 1:
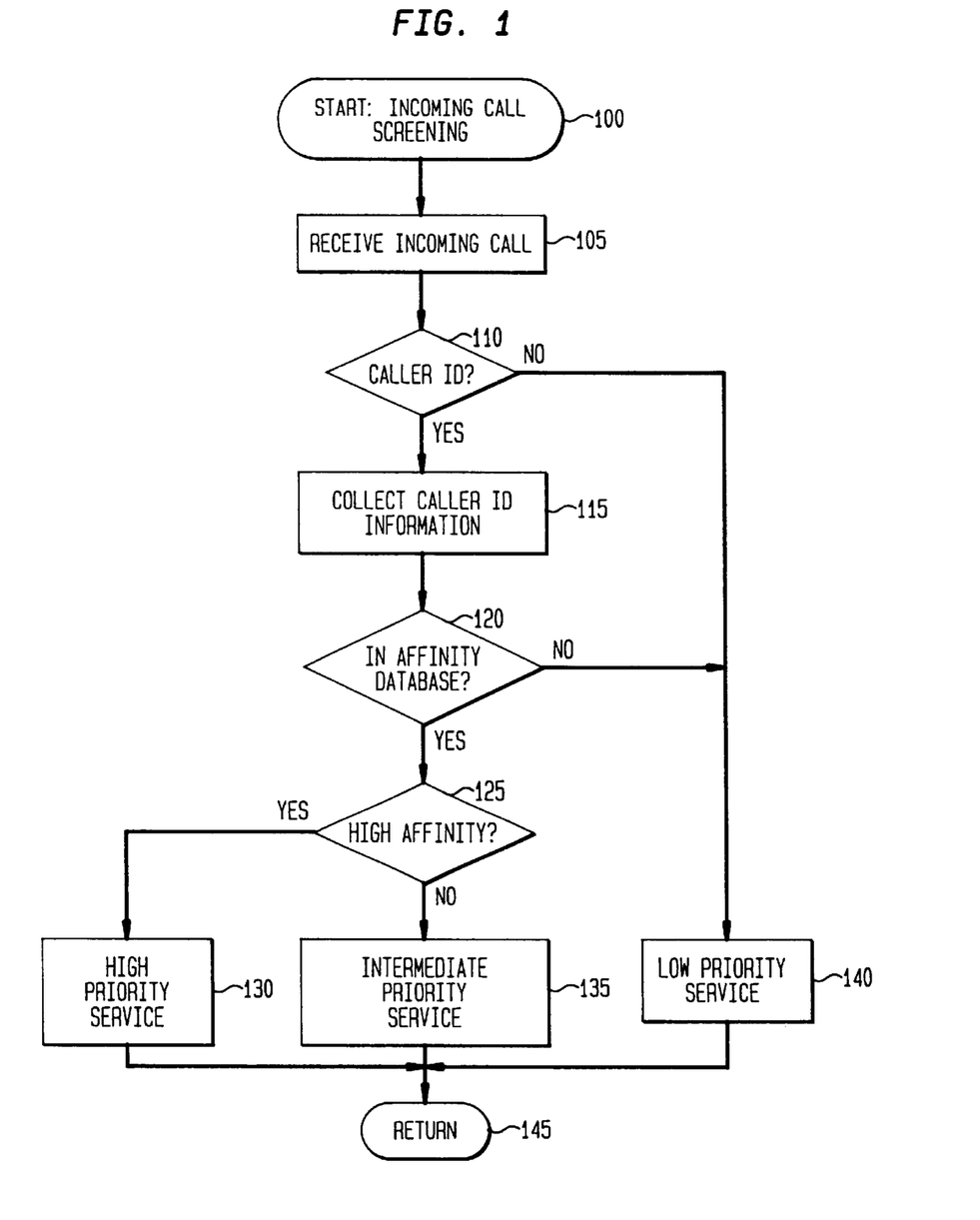
FIG. 1 is a flow diagram illustrating incoming call screening and alerting in accordance with the preferred embodiment of the method of the present invention.

FIG. 1 is a flow diagram illustrating incoming personal call screening and alerting in accordance with the preferred method embodiment of the present invention. As discussed in greater detail below, the methodology of the present invention, as illustrated in FIGS. 1–4, may be programmed and stored, as a set of program instructions for subsequent execution, in a processor and its associated memory. Such processor embodiments are illustrated as apparatus and system embodiments in FIGS. 5, 6 and 7.

Referring to FIG. 1, beginning with start step 100, the method begins with the reception of an incoming call, step 105. The present invention utilizes incoming caller identification information provided by a central office or other network to determine whether an incoming call is from someone within the called parties' affinity database. (As discussed in greater detail below, under various circumstances, private caller ID information may also be utilized without actual disclosure to the called party.) If the incoming call does not have caller identification information, in step 110, that incoming call is treated with a lower or second priority service, step 140. When the incoming call has caller identification information in step 110, that caller ID information is collected or otherwise utilized, step 115. The method then determines whether the incoming caller identification information (such as a telephone number) is in the called parties' affinity database, step 120. When the incoming caller identification information is not in the called parties' affinity database in step 120, that incoming call is also treated with the lower or second priority service, step 140. Such a lower or second priority treatment may include sending the incoming call to an answering or voice mail system, or may include various user determined or selected announcements, or both. For example, various announcements may include statements such as "the user does not wish to receive unsolicited calls", "the user is currently not available, so please call back after 8 p.m.", or simply "please leave a message after the tone". Alternatively, such second or lower priority may include a different ringing or alerting pattern, to distinguish such lower priority incoming calls from higher priority calls. Such low or lowest priority calls may also be allowed to generate a ringing signal on the line (back to the calling party) without providing a user alert (to the called party) and without answering or messaging, of any kind.

When the incoming caller identification information is in the called parties' (user's) affinity database, step 120, that incoming identification information is further examined to determine whether the user has provided varying levels or gradations of priority for persons in his or her affinity database, for the given time period, in step 125. When the incoming caller identification information indicates that the calling party has a high affinity in step 125, that incoming call is given higher or first priority treatment, step 130. For example, the user may designate that certain calling parties within the affinity database, such as their parents, children, close friends and business associates, are always to be given a higher priority service. Such a higher priority service may include allowing those calls at all times, and possibly further providing a higher priority alert, such as a different ring or alerting pattern which distinguishes such higher priority calls from lower priority calls. Similarly, the user may designate that other calling parties within the affinity database, such as distant relatives and acquaintances, be given a more intermediate priority service, such as allowing those calls except during a dinner meal time or late at night, when they are transferred to an answering or messaging system. As a consequence, when the incoming caller identification information indicates that while the calling party is within the affinity database (step 120), the calling party does not have a high affinity in step 125, and that incoming call therefore is given an intermediate priority (or third type of priority) treatment, step 135. Conversely, a user may choose to not differentiate between and among the various calling parties in his or her affinity database, in which case all incoming calls from a calling party within the affinity database are given the same level of priority treatment, such as first priority treatment, omitting step 125 and proceeding directly to, for example, step 130 from step 120. Following steps 130, 135 or 140, the incoming call screening method may end, return step 145.

In the preferred embodiment, through a user input and a user display, the user may select or program various alternatives and preferences, such as the varying levels of priority treatment mentioned above. The user may also manually override the automatic selections, such as deleting or adding a number from or to the affinity database, or selecting a higher or lower priority for a given number in the affinity database. For example, there may be calls from people that the user always wants to receive and for which the user always wants a high priority alerted for their incoming calls, even if they are not frequent or long duration calls. As a consequence, through a user display of their personal affinity database, with a user input, the user may flag or designate certain numbers for particular treatment, may add numbers which otherwise would not be in the affinity database, may delete numbers, and may provided that certain numbers always remain in the database (even if used infrequently). This user interactive method and system may also be implemented, for example, using interactive voice response with menu options, for example, indicating varying levels of priority treatment, recording of outgoing messages, and means to add, delete, and flag various numbers. Also as disclosed in the related application, name information corresponding to an affinity number may also be included in the affinity database, for ease of user reference.

As indicated above, instead of interrupting the consumer, in accordance with the present invention, incoming calls are automatically screened based on a measure of affinity (with, of course, user override capability). In the preferred embodiment of the invention, affinity is measured or determined utilizing the concept that consumers have a higher affinity and are more likely to want to receive calls from people that they either call themselves, or from people with whom previously they have had long conversations. Conversely, a lesser or non-affinity is based upon consumers being less likely to want to receive a call from people they themselves do not call, or from people with whom they have never had a long conversation. As illustrated in greater detail below with respect to FIGS. 2–4, the preferred method embodiment develops an affinity database as an affinity list of preferred numbers, by storing the telephone numbers of all calls originated by the user's telephone, and storing incoming caller ID information from those telephone calls having a minimum, predetermined duration. As the affinity database is maintained, a list or stack format is utilized, to incorporate a frequency measurement or determination of called and calling numbers within the affinity database, such that high frequency numbers are in the top or upper portion of the affinity list or stack. Other database management methods may also be utilized.

The apparatus, method and system may also be programmed to automatically activate and deactivate the call screening service at specified times of the day, for example, at meal times, in the late evening, or whenever a consumer does not wish to be disturbed.

Figure 2:
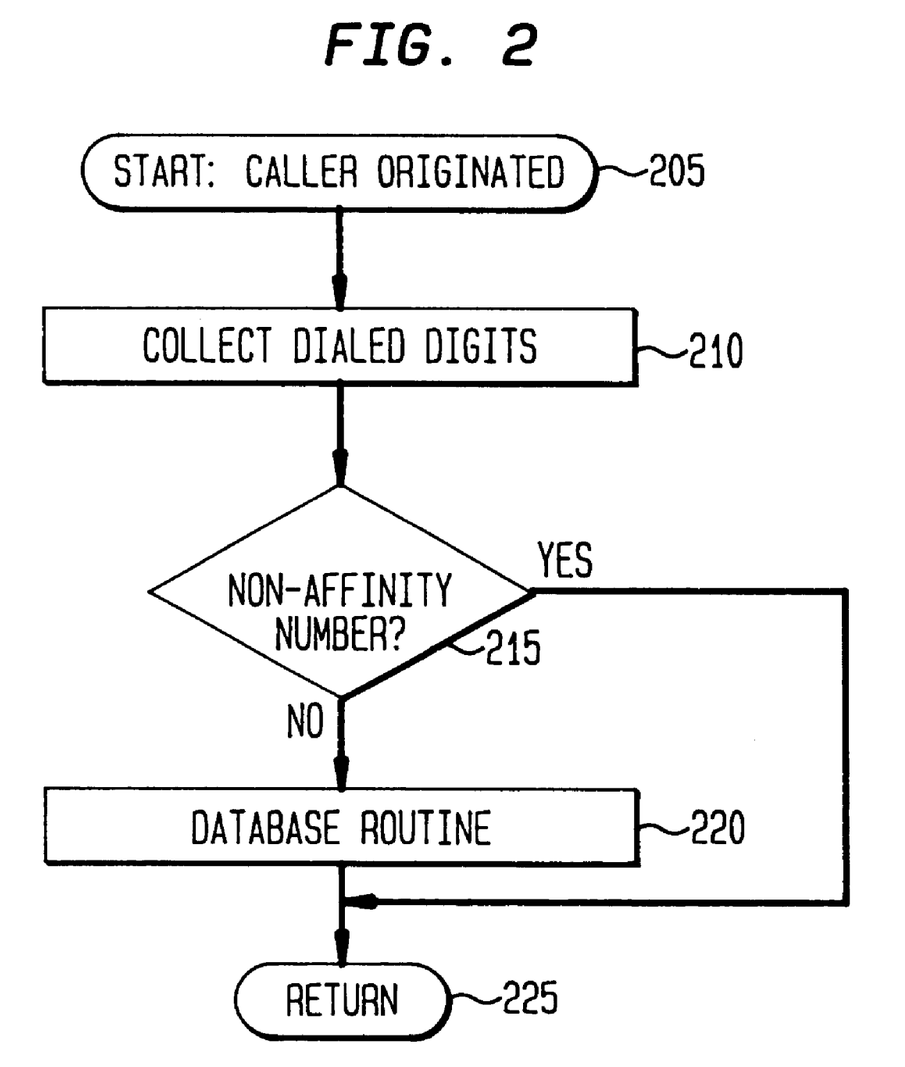
FIG. 2 is a flow diagram illustrating an affinity data generation routine from caller originated communications in accordance with the method of the present invention.

FIG. 2 is a flow diagram illustrating an affinity data generation routine based upon user originated calls. The method begins, start step 205, when the user originates a telephone call or other telecommunication session. The method collects and stores the dialed number (digits), step 210, such as the numerical digits entered by the caller. Next, in step 215, the method determines whether the collected dialed telephone digits are for a non-affinity number, such as 800 or 888 numbers, 911 emergency numbers, 411 and 1-area code-555-1212 directory assistance calls. When the dialed digits are for such a non-affinity number in step 215, the affinity data generation routine may end, return step 225. When the dialed digits are not for a non-affinity number in step 215, i.e., the dialed digits are for an ordinary telephone number, that telephone number is then added to the affinity database (as an affinity number), step 220, which is illustrated in detail as an affinity database (stack) routine in FIG. 4. Following step 220, the caller originated data generation routine of the preferred method embodiment may end, return step 225.

Figure 3:
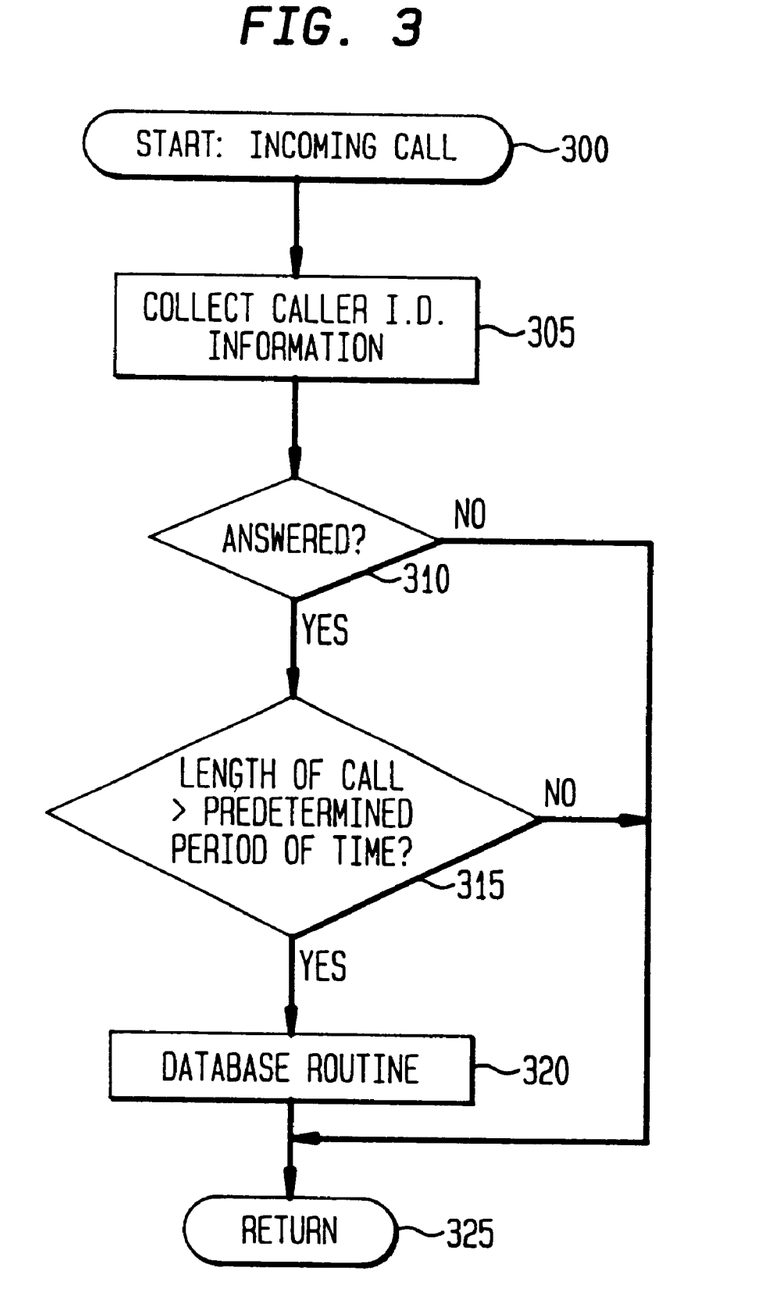
FIG. 3 is a flow diagram illustrating an affinity data generation routine from incoming calls in accordance with the method of the present invention.

FIG. 3 is a flow diagram illustrating affinity data generation based upon incoming calls. Beginning with reception of an incoming call, start step 300, the method collects and stores caller ID information (such as incoming telephone number), step 305. When the user has answered or accepted the incoming call, step 310, and when the duration or length of that call is greater than a minimum or other predetermined period of time, step 315, then the caller ID information (telephone number) for that incoming call is added to the affinity database, step 320, which is also illustrated in greater detail with respect to FIG. 4. In the preferred embodiment, the user may specify or program what predetermined period of time he or she would like as a minimum incoming call duration for adding an incoming call telephone number to the affinity database, based on his or her individual conversation patterns. For example, a particular user may feel that only incoming calls lasting more than five minutes should be included in the affinity database, while another less talkative user may want all calls lasting more than three minutes. Default values may also be provided for the predetermined period of time, such as three minutes. In addition, varying values may also be provided, with correspondingly higher priorities assigned to longer calls. When either the user either does not answer the incoming call (in step 310) or when the duration of the incoming call is less than the predetermined period of time (in step 315), the method does not add that caller ID information to the affinity database, and the incoming call affinity database generation routine of the preferred method embodiment may end, return step 325. As mentioned above, as an affinity measurement, the method presumes that an unanswered call or a call of such a short duration is due to the unwanted nature of the incoming call, and as a consequence, that incoming caller ID information is not automatically added to the affinity database, but may be added through user input.

Figure 4:
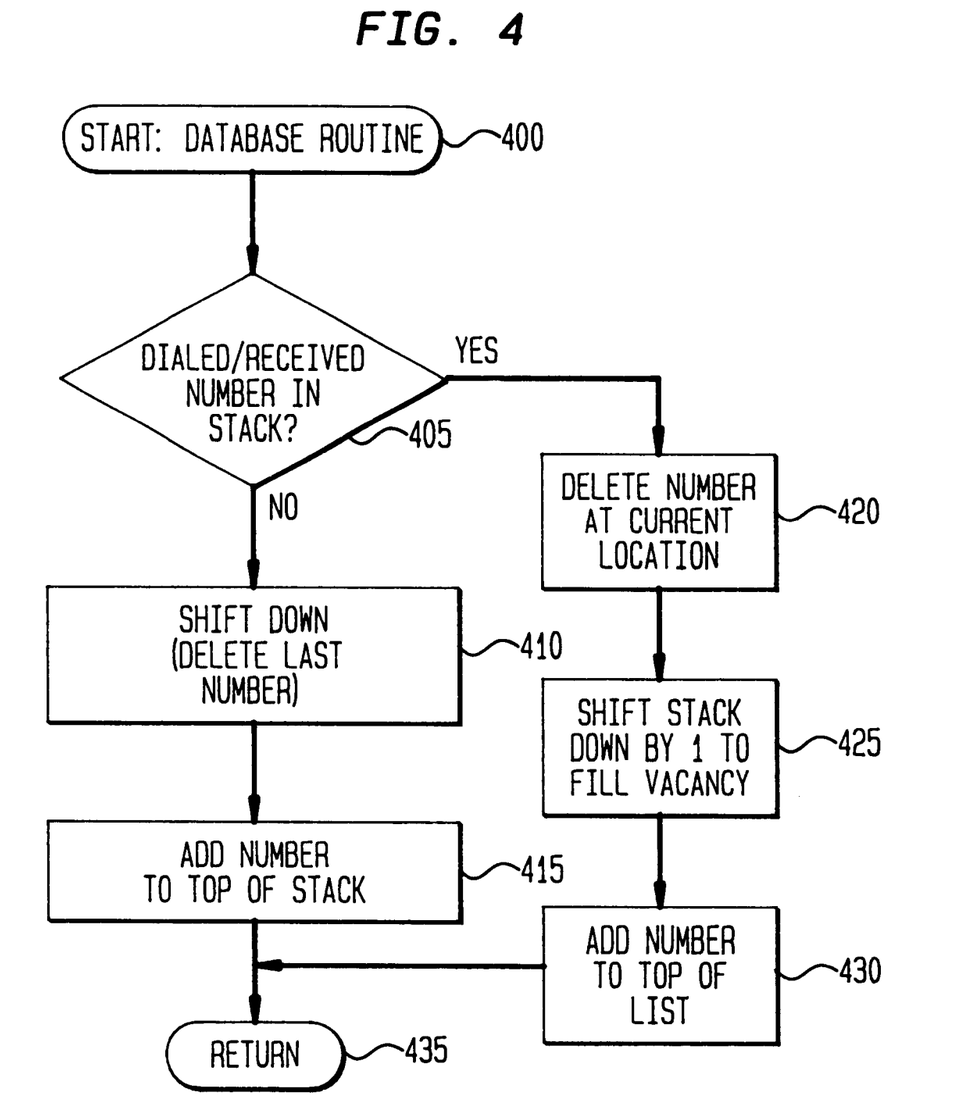
FIG. 4 is a flow diagram illustrating affinity list or stack generation and maintenance in accordance with the preferred method embodiment of the present invention.

FIG. 4 is a flow diagram illustrating an affinity stack (or list) generation and maintenance routine in accordance with the preferred method embodiment of the present invention. Beginning with start step 400, as mentioned above, this routine is called or invoked from either step 220 (FIG. 2) or step 320 (FIG. 3), and is utilized to add a new telephone number to the affinity database, or to change the position a telephone number within an ordering of the affinity database. Also as mentioned above, in preferred embodiment, the affinity database is managed as a list or a stack, with the more recent or the more high frequency telephone numbers clustered at the top or upper portion of the stack. As such, these more recent or more high frequency telephone numbers in the upper portion of the stack may also be considered to be higher priority affinity numbers.

There are, however, myriad other equivalent ways of both managing the affinity database and assigning such priorities, including user input and programming options. For example, as the affinity database is generated, user input may be utilized to add or delete telephone numbers, and to assign corresponding priorities. Also for example, such user input may occur through an interactive voice menu or an interactive display. Also as mentioned above, another possible method of assigning and managing priorities may be based on the duration of the call, with affinity numbers assigned a greater priority based upon longer durations of the calls. These various methods of management and prioritization may also be combined, utilizing any number of ordering or statistical algorithms.

In addition, the preferred method of the present invention, as embodied in this database stack routine, presumes that there is a finite amount of memory or other storage capacity for storing the individual user's affinity database. In addition, there is also typically a finite amount of processing time available for database searching, and extremely fast processing is preferred for consumer satisfaction. As a consequence of such a finite amount of memory and finite processing time, in the preferred embodiment, the affinity database is also generated and managed on a finite basis, with comparatively higher frequency/higher priority affinity telephone numbers preferably retained in lieu of comparatively lower frequency/lower priority affinity telephone numbers. In the event of a space shortage or other conflict, the lower frequency or lower priority telephone numbers are deleted from the database. Enough memory and processing capability may be utilized, however, such that a complete, undeleted database also may be available to a typical consumer (e.g., having sufficient memory and processing capability for several hundred potential affinity telephone numbers).

Referring to FIG. 4, following invocation of this routine in start step 400, the routine begins with determining whether either the dialed telephone number (from step 220, FIG. 2) or the received telephone number (from step 315, FIG. 3) is currently in the affinity stack or list, step 405. When the dialed or received number is not currently in the affinity stack in step 405, the method proceeds to shift all entries in the affinity list down by 1 (also thereby potentially deleting the last number on the affinity list, if any, when memory space may be limited), step 410. The new affinity number is then added to the top of the stack, step 415. In step 405, when the dialed or received number is already in the affinity database, the method proceeds to step 420, and deletes that telephone number at its current stack location, leaving a vacancy in the stack. The method then shifts all higher frequency numbers down by 1 to fill the vacancy, step 425, and adds the current affinity number to the top of the stack, step 430. In this way, affinity numbers used with the most frequency and which were used most recently, comparatively, are retained toward the top or upper portion of the stack and, as mentioned above, may be assigned a corresponding priority based upon stack location. Also as mentioned above, a wide variety of equivalent alternatives are available for such stack or memory management, including prioritization based upon other or additional factors besides frequency, such as call duration as mentioned above, or calls received during a previous period of time, such as the previous thirty days. Following steps 415 or 430, the database stack management routine may end, return step 435.

Not separately illustrated, when the affinity database is also to be maintained as a stack, other management methods may be utilized in lieu of or in addition to the methodology illustrated in FIG. 4. For example, new received or dialed telephone numbers may be inserted initially into the middle or center of the stack. Subsequently, when used with greater or lesser comparative frequency, a corresponding telephone number will, respectively, percolate up in the stack or be pushed down in the stack. As a consequence, such a methodology would incorporate the frequency parameter illustrated in FIG. 4, without simultaneously incorporating a recency parameter as well.

Figure 5:
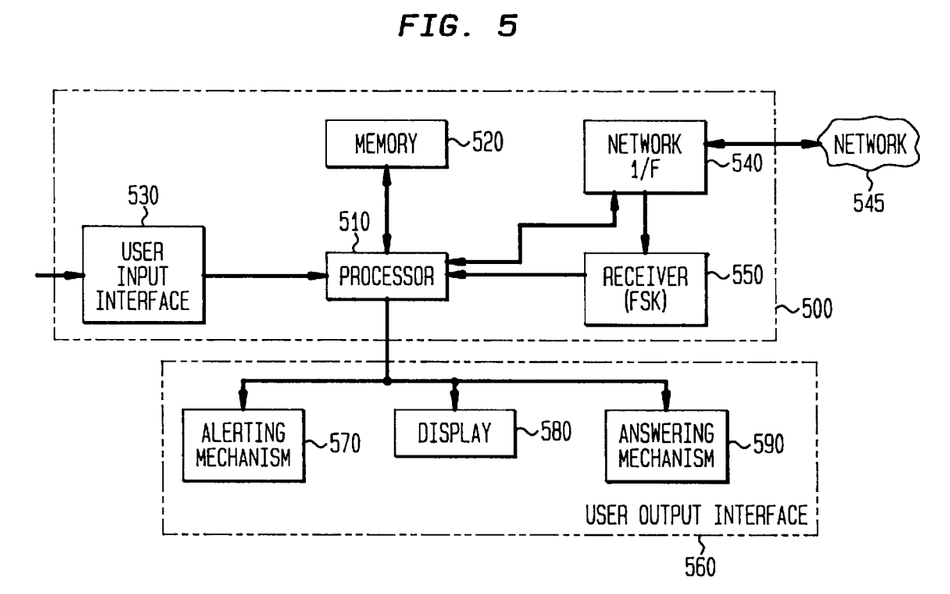
FIG. 5 is a block diagram illustrating an apparatus embodiment in accordance with the present invention.

FIG. 5 is a block diagram illustrating an apparatus embodiment in accordance with the present invention. The apparatus 500 may be included, for example, in a telephone or other customer premise equipment. Referring to FIG. 5, the apparatus 500 includes a processor 510, a memory 520, a user input interface 530, a network interface 540, and a receiver (or decoder) 550 (such as an FSK (frequency shift keying) receiver or decoder. In the preferred embodiment, the apparatus 500 also includes a user output interface 560, which may have one or more output devices such as alerting mechanism 570, a display 580, or an answering mechanism 590.

Continuing to refer to FIG. 5, the processor 510 (and processor 610 of FIGS. 6 and 7) may include a single integrated circuit ("IC"), or may include a plurality of integrated circuits or other components connected, arranged or grouped together, such as microprocessors, digital signal processors ("DSPs"), application specific integrated circuits ("ASICs"), associated memory (such as RAM and ROM), and other ICs and components. As a consequence, as used herein, the term processor should be understood to equivalently mean and include a single processor, or arrangement of processors, microprocessors, controllers, or some other grouping of integrated circuits which perform the functions discussed in greater detail below, with associated memory, such as microprocessor memory or additional RAM, ROM, EPROM or $E^2$PROM. As indicated above with reference to FIGS. 1–4, the methodology of the invention may be programmed and stored, in the processor 510 (and processor 610, FIGS. 6 and 7) with its associated memory and other equivalent components, as a set of program instructions for subsequent execution when the processor 510 (or 610) is operative (i.e., the processor 510 or 610 is powered on and functioning).

The user input interface 530, such as a keypad, is utilized to receive input from the user, such as the input of a number to be dialed. The user input interface 530 may also be utilized for manual overrides and user preference programming discussed above. The memory 520 is utilized for the storage of the user's affinity database. The network interface 540 provides connectivity to a network 545, such as providing tip and ring connections to a public (or general) switched telephone network. The receiver (or decoder) 550 is utilized to decode incoming signals which encode incoming caller ID information, typically utilizing FSK encoding. An equivalent or another type of receiver may also be utilized in the event incoming caller ID information is encoded in a format other than FSK. The user output interface 560, as mentioned above, may contain one or more output devices to alert or signal the user to an incoming call or screened call. For example, the alerting mechanism 570 may be an auditory or other audible ringer, the display 580 may be a visual display such as an LCD display, and the answering mechanism 590 may be a telephone call answering or voice mail system.

As discussed above with reference to FIGS. 1–4, when an incoming call is received by the network interface 540, incoming caller ID information is decoded by receiver 550, and examined by processor 510 to determine whether the incoming call is from a source within the affinity database, as stored within the memory 520. When the incoming call is from a source within the affinity database (step 120, FIG. 1), the processor 510 gives it corresponding priority treatment (steps 125, 130 and 135), such as alerting the user to the incoming call, through alerting mechanism 570 or display 580. Similarly, when the incoming call is not from a source within the affinity database (step 120) or does not include caller ID information (step 110), the processor 510 gives that incoming call a lower priority service (step 140), such as routing that call to an answering mechanism 590.

Similarly, the processor 510 creates the affinity database, to be stored in memory 520, from user originated calls (the routine of FIG. 2) via the user input interface 530, and incoming calls (the routine of FIG. 3) via the network interface 540 and receiver 550. The processor 510 also manages the affinity database or stack via its program instructions (the method of FIG. 4 or another database management method) and the memory 520.

Figure 6:
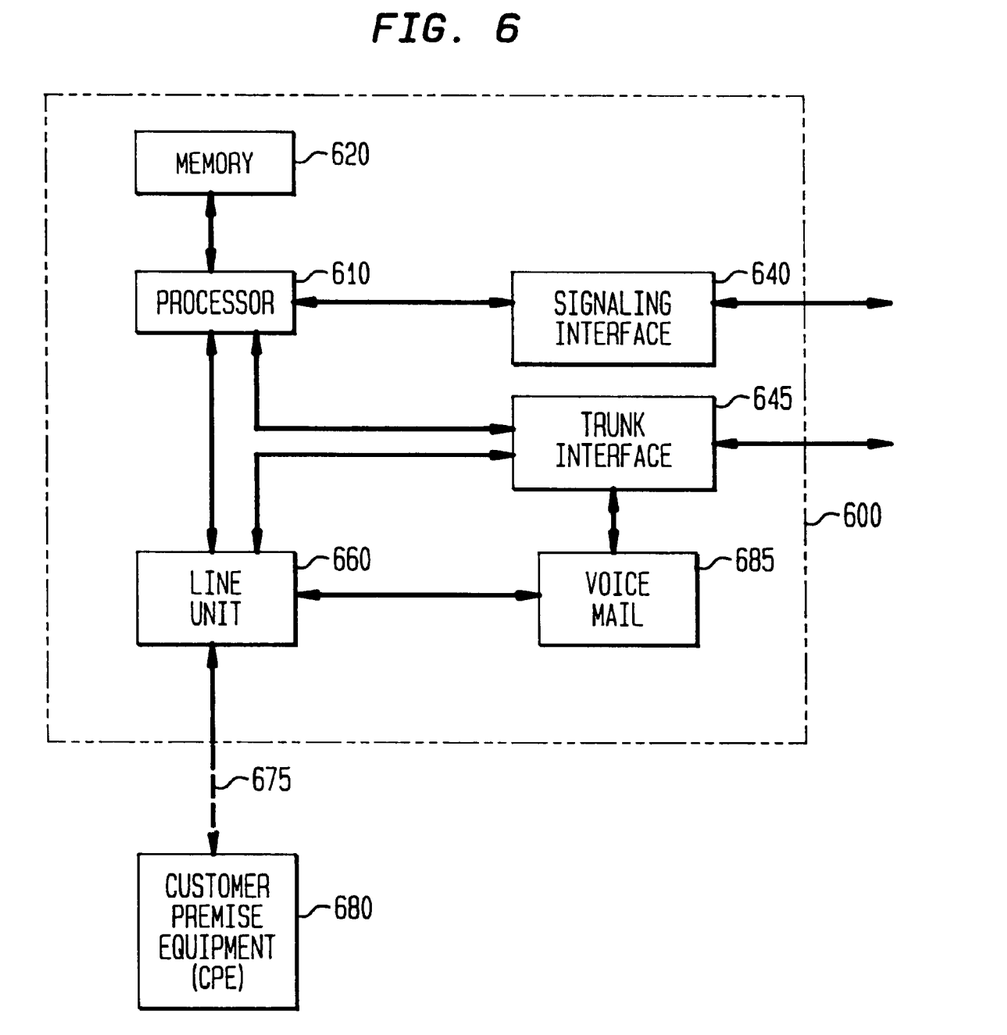
FIG. 6 is a block diagram illustrating a first system embodiment in accordance with the present invention.

FIG. 6 is a block diagram illustrating a first system embodiment in accordance with the present invention. The system 600 may be included within, for example, a telephone network switch, in a network central office, or within other telecommunication service provider equipment which provides service to customer premise equipment 680. As in the apparatus 500 embodiment, the system 600 also includes a processor 610 and a memory 620. The system 600 also includes a signaling interface 640 (such as an SS7 signaling interface) for, among other things, interfacing to a signaling portion of a network, and a trunk (or trunking) interface 645 for interfacing to a voice portion of a network. For telecommunications, such as voice and data communications, the signaling portion of the network typically transports caller ID information and the called telephone number to the network switch (or switching fabric). At the same time, the trunking interface 645 (or trunking portion of the network) provides the path for a corresponding network communication, such as the path for a voice or data call. The system 600 is couplable typically through a twisted pair communication channel 675 to customer premise equipment 680 via a line unit 660.

As discussed above with reference to FIGS. 1–4, when an incoming call is received by the signaling interface 640 for the customer premises 680, incoming caller ID information examined by the processor 610 to determine whether the incoming call is from a source within the affinity database, as stored within the memory 620. When the incoming call is from a source within the affinity database (step 120, FIG. 1), the processor 610 gives this incoming call, as a corresponding network communication in the trunking portion of the network, corresponding priority treatment (steps 125, 130 and 135), such as alerting the user to the incoming call or providing a distinctive ring, through line unit 660. Similarly, when the incoming call is not from a source within the affinity database (step 120) or does not include caller ID information (step 110), the processor 610 gives that incoming call (as a corresponding network communication in the trunking portion of the network) a lower priority service (step 140), such as routing that corresponding network communication (call) to a voice mail system 685 or other answering and/or messaging system.

Similarly, the processor 610 creates the affinity database, to be stored in memory 620, from user originated calls (the routine of FIG. 2) via the line unit 660, and incoming calls (the routine of FIG. 3) via the signaling interface 640. The processor 610 also manages the affinity database or stack via its program instructions (the method of FIG. 4) and the memory 620.

As indicated above, in these various system embodiments 600 and 700 (discussed below with reference to FIG. 7), when embodied within a network central office, the various systems 600 and 700 may also receive caller ID information from a calling party which is designated as private. This private caller ID information is typically not displayed to the called party, but is received or otherwise known to the central office. Under these circumstances, without disclosure to the called party and still maintaining the privacy of the information, the private caller ID information may still be utilized for call screening and alerting in accordance with the present invention. As with any caller ID information, the usage patterns may still be observed for the database management and call screening purposes herein, and the requested privacy maintained by not downloading or disclosing the private information to the called party.

Figure 7:
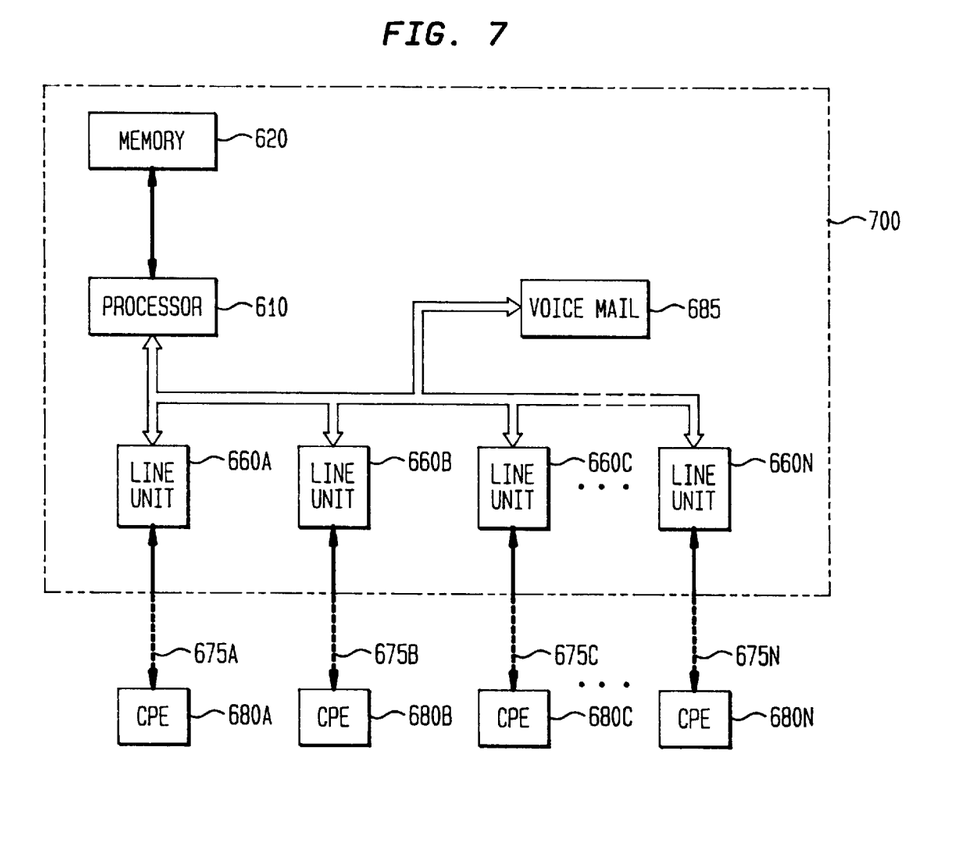
FIG. 7 is a block diagram illustrating a second system embodiment in accordance with the present invention.

FIG. 7 is a block diagram illustrating a second system embodiment in accordance with the present invention. The system 700 also may be included within, for example, a telephone network switch, in a network central office, or within other telecommunication service provider equipment which provides service to customer premise equipment ("CPE") 680A, 680B, 680C through 680N. The system 700 is utilized for line to line calls and, as a consequence, does not require the signaling interface 640 or the trunk interface 645 of the system 600. As in the apparatus 500 embodiment and the system 600 embodiment, the system 700 also includes a processor 610 and a memory 620. Also as in the system 600 embodiment, the system 700 includes a voice mail unit 685, and additionally includes a plurality of line units 660A, 660B, 660C through 660N (collectively line units 660), which are respectively couplable to a corresponding plurality of CPEs 680A, 680B, 680C through 680N (collectively CPEs 680), via respective communication channels 675A, 675B, 675C through 675N. Typically, and in the preferred embodiments, the systems 600 and 700 are combined into one overall system for handling both trunk calls and line to line calls.

As discussed above with reference to FIGS. 1–6, when an incoming call is received by one of the line units 660, the processor 610 examines the incoming call to determine if the call is to be routed to one of the line units 660 under the control or auspices of the processor 610. For such line to line calls, the incoming caller ID information is examined by the processor 610 to determine whether the incoming call is from a source within the affinity database, as stored within the memory 620. When the incoming call is from a source within the affinity database (step 120, FIG. 1), the processor 610 gives this incoming call, corresponding priority treatment (steps 125, 130 and 135), such as alerting the user to the incoming call or providing a distinctive ring, through one of the line units 660 which is connected to the user's CPE 680. Similarly, when the incoming call is not from a source within the affinity database (step 120) or does not include caller ID information (step 110), the processor 610 gives that incoming call a lower priority service (step 140), such as routing that corresponding network communication (call) to a voice mail system 685 or other answering and/or messaging system.

Similarly, the processor 610 creates the affinity database, to be stored in memory 620, from user originated calls (the routine of FIG. 2) and incoming calls (the routine of FIG. 3), both via the line units 660. The processor 610 also manages the affinity database or stack via its program instructions (the method of FIG. 4) and the memory 620.

As may be apparent from the above discussion, the various embodiments of the present invention are not limited to voice communications, but may be extended to a wide variety of modern telecommunications. For example, the embodiments of the present invention may be applied to screen and or block incoming fax communications, such as to block junk faxes or other unsolicited or unwanted faxes. The various embodiments may also be applied to newer types of communication, such as video conferencing and other video communications.

Numerous other advantages of the present invention may be apparent from the above discussion. First, the present invention provides for incoming call screening and alerting automatically, without consumer interruption and without personal involvement in the screening process. The present invention provides such automatic screening in accordance with the personal and tailored needs, tastes and preferences of the individual telecommunication consumer. In addition, the apparatus, method and system are user friendly, cost effective, and capable of implementation in existing telecommunication systems.

The present invention is able to provide such automatic personal call screening and alerting while incorporates the "organic persona" concept. Not only are these services personalized or customized to the needs or preferences of individual consumers, but also the telecommunication network or system, or the customer premise equipment, automatically learns these preferences by observing the actual or real actions or activities of the individual consumer. These various embodiments of the present invention thereby provide significant advantages to a telecommunication consumer.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

I claim:

1. A method for personal telecommunication call screening and alerting, the method comprising:
 (a) receiving an incoming telecommunication call;
 (b) determining whether caller identification information from the incoming telecommunication call is associated with an affinity number from an affinity database, the affinity database having a plurality of affinity numbers, the plurality of affinity numbers having been determined by including telephone numbers corresponding to outgoing telecommunication calls, and by including telephone numbers from received incoming calls having a user selected, predetermined minimum off-hook duration;

(c) when the caller identification information is associated with an affinity number and when the incoming telecommunication call is received during a first user determined period of time, assigning a first priority and providing a user alert to the incoming telecommunication call; and (d) when the caller identification information is not associated with an affinity number or when the incoming telecommunication call is received during a second user determined period of time, assigning a second priority and not providing a user alert to the incoming telecommunication call.

2. The method of claim 1, further comprising:

(e) when the incoming telecommunication call does not include caller identification information, assigning the second priority to the incoming telecommunication call.

3. The method of claim 1 wherein the user alert is a distinctive ring.

4. The method of claim 1, further comprising:

providing telecommunication messaging and answering to the incoming call having the second priority.

5. The method of claim 1, further comprising:

providing telecommunication messaging to the incoming call having the second priority.

6. The method of claim 1, wherein the affinity database is maintained as an affinity stack.

7. The method of claim 6, wherein any affinity numbers, of the plurality of affinity numbers, having a comparatively higher frequency of use are clustered in an upper portion of the affinity stack.

8. The method of claim 6, wherein any affinity numbers, of the plurality of affinity numbers, having a comparatively higher duration of use are clustered in an upper portion of the affinity stack.

9. The method of claim 1, wherein step (c) further comprises:

(c1) when the caller identification information is associated with an affinity number, further determining whether the affinity number has a first affinity;

(c2) when the affinity number has the first affinity, assigning the first priority to the incoming telecommunication call; and (c3) when the affinity number does not have the first affinity, assigning a third priority to the incoming telecommunication call.

10. An apparatus for personal telecommunication call screening and alerting, the apparatus comprising:

a network interface for receiving an incoming telecommunication call;

a receiver coupled to the network interface, the receiver for decoding caller identification information from a received incoming telecommunication call;

a memory, the memory storing an affinity database having a plurality of affinity numbers;

a user input interface coupled to the processor for entry of a number corresponding to an outgoing telecommunication call;

a user output interface coupled to the processor, the user output interface for generating a user alert; and a processor coupled to the memory, to the user input interface, to the user output interface and to the receiver, wherein the processor includes instructions for determining whether decoded caller identification information from the received incoming telecommunication call is associated with an affinity number from the affinity database; the processor having further instructions for determining the plurality of affinity numbers by including in the affinity database a number corresponding to the outgoing telecommunication call and by including in the affinity database a number corresponding to a received incoming telecommunication call having a predetermined minimum off-hook duration; the processor having further instructions for assigning a first priority and providing the user alert to the received incoming telecommunication call when the decoded caller identification information is associated with an affinity number and when the incoming telecommunication call is received during a first user determined period of time, and for assigning a second priority and not providing the user alert to the received incoming telecommunication call when the decoded caller identification information is not associated with an affinity number or when the incoming telecommunication call is received during a second user determined period of time.

11. The apparatus of claim 10, wherein the processor includes further instructions for assigning the second priority to the received incoming telecommunication call when the incoming telecommunication call does not include caller identification information.

12. The apparatus of claim 10 wherein the user output interface includes a ringer circuit and the user alert is a distinctive ring.

13. The apparatus of claim 10, wherein the user input interface receives user input of the first and second user determined periods of time.

14. The apparatus of claim 10, wherein the user output interface includes answering and messaging circuitry for providing telecommunication messaging and answering to the received incoming telecommunication call having the second priority.

15. The apparatus of claim 10, wherein the user output interface includes messaging circuitry for providing telecommunication messaging to the received incoming telecommunication call having the second priority.

16. The apparatus of claim 10, wherein the processor includes further instructions for maintaining the affinity database as an affinity stack.

17. The apparatus of claim 16, wherein the processor includes further instructions for clustering, in an upper portion of the affinity stack, any affinity numbers of the plurality of affinity numbers having a comparatively higher frequency of use.

18. The apparatus of claim 16, wherein the processor includes further instructions for clustering, in an upper portion of the affinity stack, any affinity numbers of the plurality of affinity numbers having a comparatively higher duration of use.

19. The apparatus of claim 10, wherein the processor includes further instructions for determining, when the caller identification information is associated with an affinity number, whether the affinity number has a first affinity; the processor including further instructions for assigning the first priority to the received incoming telecommunication call when the affinity number has the first affinity, and for assigning a third priority to the received incoming telecommunication call when the affinity number does not have the first affinity.

20. The apparatus of claim 10, wherein the apparatus is embodied within customer premise equipment.

21. The apparatus of claim 10, wherein the apparatus is embodied within a telephone.

22. A system for personal telecommunication call screening and alerting, the system comprising:
- a line unit couplable to customer premise equipment, the line unit for reception of a number corresponding to an outgoing telecommunication call and for generating a user alert;
- a network signaling interface for receiving network signaling information;
- a network trunk interface for receiving corresponding network communications;
- a memory, the memory storing an affinity database having a plurality of affinity numbers; and
- a processor coupled to the memory, to the line unit, to the network signaling interface, and to the network trunk interface, wherein the processor includes instructions for determining whether received network signaling information includes caller identification information which is associated with an affinity number from the affinity database; the processor having further instructions for determining the plurality of affinity numbers by including in the affinity database a number corresponding to the outgoing telecommunication call and by including in the affinity database a number corresponding to a user received incoming telecommunication call having a predetermined minimum off-hook duration; the processor having further instructions for assigning a first priority and providing the user alert to a corresponding network communication when the caller identification information is associated with an affinity number and when the corresponding network communication is during a first user determined period of time, and for assigning a second priority and not providing the user alert to the corresponding network communication when the caller identification information is not associated with an affinity number or when the corresponding network communication is during a second user determined period of time.

23. The system of claim 22, wherein the processor includes further instructions for assigning the second priority to the corresponding network communication when the network signaling information does not include caller identification information.

24. The system of claim 22 wherein the user alert is a distinctive ring.

25. The system of claim 22, wherein the line unit receives user input; and wherein the first and second user determined periods of time are determined by user input.

26. The system of claim 22, further comprising voice mail circuitry coupled to the line unit and the network trunk interface for providing telecommunication messaging and answering for the corresponding network communication having the second priority.

27. The system of claim 22, further comprising messaging circuitry coupled to the line unit and the network trunk interface for providing telecommunication messaging for the corresponding network communication having the second priority.

28. The system of claim 22, wherein the processor includes further instructions for maintaining the affinity database as an affinity stack.

29. The system of claim 28, wherein the processor includes further instructions for clustering, in an upper portion of the affinity stack, any affinity numbers of the plurality of affinity numbers having a comparatively higher frequency of use.

30. The system of claim 28, wherein the processor includes further instructions for clustering, in an upper portion of the affinity stack, any affinity numbers of the plurality of affinity numbers having a comparatively higher duration of use.

31. The system of claim 22, wherein the processor includes further instructions for further determining, when the caller identification information is associated with an affinity number, whether the affinity number has a first affinity; the processor including further instructions for assigning the first priority to the corresponding network communication when the affinity number has the first affinity, and for assigning a third priority to the corresponding network communication when the affinity number does not have the first affinity.

32. The system of claim 22, wherein the system is embodied in a network switch.

33. The system of claim 22, wherein the system is embodied in a central office.

34. A system for personal telecommunication call screening and alerting, the system comprising:
- a line unit couplable to customer premise equipment, the line unit for reception of a number corresponding to an outgoing telecommunication call and for generating a user alert;
- a memory, the memory storing the affinity number in an affinity database having a plurality of affinity numbers; and
- a processor coupled to the memory and to the line unit, wherein the processor includes instructions for determining whether caller identification information is associated with an affinity number from the affinity database; the processor having further instructions for determining the plurality of affinity numbers by including in the affinity database a number corresponding to the outgoing telecommunication call and by including in the affinity database a number corresponding to a user received incoming telecommunication call having a predetermined minimum off-hook duration; the processor having further instructions for assigning a first priority and providing a user alert to a corresponding communication when the caller identification information is associated with an affinity number and when the corresponding communication is during a first user determined period of time, and for assigning a second priority and not providing a user alert to the corresponding communication when the caller identification information is not associated with an affinity number or when the corresponding communication is during a second user determined period of time.

35. The system of claim 34, wherein the processor includes further instructions for assigning the second priority to the corresponding communication in the absence of caller identification information.

36. The system of claim 34 wherein the user alert is a distinctive alert.

37. The system of claim 34, wherein the line unit receives user input; and wherein the predetermined period of time is determined by user input.

38. The system of claim 34, further comprising voice mail circuitry coupled to the line unit for providing telecommunication messaging and answering for the corresponding communication having the second priority.

39. The system of claim 34, further comprising messaging circuitry coupled to the line unit for providing telecommunication messaging for the corresponding communication having the second priority.

40. The system of claim 34, wherein the processor includes further instructions for maintaining the affinity database as an affinity stack.

41. The system of claim 40, wherein the processor includes further instructions for clustering, in an upper portion of the affinity stack, any affinity numbers of the plurality of affinity numbers having a comparatively higher frequency of use.

42. The system of claim 40, wherein the processor includes further instructions for clustering, in an upper portion of the affinity stack, any affinity numbers of the plurality of affinity numbers having a comparatively higher duration of use.

43. The system of claim 34, wherein the processor includes further instructions for further determining, when the caller identification information is associated with an affinity number, whether the affinity number has a first affinity; the processor including further instructions for assigning the first priority to the corresponding network communication when the affinity number has the first affinity, and for assigning a third priority to the corresponding network communication when the affinity number does not have the first affinity.

44. The system of claim 34, wherein the system is embodied in a network switch.

45. The system of claim 34, wherein the system is embodied in a central office.

* * * * *